(12) United States Patent
Yadav

(10) Patent No.: US 10,199,667 B2
(45) Date of Patent: Feb. 5, 2019

(54) SEGMENTED CATION-ANION EXCHANGE MEMBRANE FOR SELF-HUMIDIFICATION OF FUEL CELLS AND METHOD OF MAKING

(71) Applicant: Nissan North America, Inc., Franklin, TN (US)

(72) Inventor: Rameshwar Yadav, Novi, MI (US)

(73) Assignee: Nissan North America, Inc., Franklin, TN (US)

(*) Notice: Subject to any disclaimer, the term of this patent is extended or adjusted under 35 U.S.C. 154(b) by 177 days.

(21) Appl. No.: 15/365,799

(22) Filed: Nov. 30, 2016

(65) Prior Publication Data

US 2018/0151900 A1 May 31, 2018

(51) Int. Cl.
*H01M 8/04291* (2016.01)
*H01M 8/1004* (2016.01)
*H01M 8/1007* (2016.01)
*H01M 8/1044* (2016.01)
*H01M 8/1016* (2016.01)
*H01M 8/1069* (2016.01)
*H01M 8/1058* (2016.01)
(Continued)

(52) U.S. Cl.
CPC ... *H01M 8/04291* (2013.01); *H01M 8/04119* (2013.01); *H01M 8/1004* (2013.01); *H01M 8/1016* (2013.01); *H01M 8/1044* (2013.01); *H01M 8/1058* (2013.01); *H01M 8/1069* (2013.01); *H01M 8/1007* (2016.02); *H01M 2008/1095* (2013.01); *H01M 2300/0082* (2013.01); *Y02P 70/56* (2015.11)

(58) Field of Classification Search
CPC ........... H01M 8/04291; H01M 8/1016; H01M 8/1007; H01M 8/1069; H01M 8/1004; H01M 8/1044; H01M 2008/1095; H01M 2300/0082

See application file for complete search history.

(56) References Cited

U.S. PATENT DOCUMENTS 5,783,324 A * 7/1998 Binder ............... H01M 8/241
429/492
2002/0034671 A1 3/2002 Ito
(Continued)

FOREIGN PATENT DOCUMENTS

DE 102012017598 * 3/2014
DE 102012017598 A1 3/2014

OTHER PUBLICATIONS

Xiaoming Ge et al., Oxygen Reduction in Alkaline Media: From Mechanisms to Recent Advances of Catalysts, ACS Catalysis, Jun. 29, 2015, pp. 4643-4667, vol. 5.
(Continued)

*Primary Examiner* — Lisa S Park
(74) *Attorney, Agent, or Firm* — Young Basile Hanlon & MacFarlane, P.C.

(57) ABSTRACT

A membrane electrode assembly for a fuel cell has a segmented membrane including a porous support having a surface area, the surface area divided into a first portion and a second portion. An alkaline segment is formed from the first portion of the porous support imbibed with an alkaline ionomer. An acid segment is formed from the second portion of the porous support imbibed with an acid ionomer. The alkaline segment is sized to provide a humidification amount to a feed gas passing through the acid segment.

13 Claims, 8 Drawing Sheets

(51) Int. Cl.
*H01M 8/04119* (2016.01)
*H01M 8/1018* (2016.01)

(56) References Cited

U.S. PATENT DOCUMENTS

| | | |
|---|---|---|
| 2004/0053098 A1 | 3/2004 | Schiffrin et al. |
| 2004/0096718 A1 | 5/2004 | Gomez |
| 2004/0115498 A1* | 6/2004 | McDonald ......... B01D 67/0093 521/27 |
| 2004/0241518 A1* | 12/2004 | Yang ................. B01D 67/0088 429/494 |
| 2010/0316933 A1* | 12/2010 | Tachibana .............. H01B 1/122 429/494 |
| 2011/0236785 A1* | 9/2011 | Imura ................. H01M 8/2418 429/479 |
| 2013/0029242 A1 | 1/2013 | Mizuhata et al. |

OTHER PUBLICATIONS

I. Kruusenberg et al., Non-platinum cathode catalysts for alkaline membrane fuel cells, International Journal of Hydrogen Energy, 2012, pp. 4406-4412, vol. 37.
Shin-AA Park et al., Bifunctional enhancement of oxygen reduction reaction activity on Ag catalysts due to water activation on LaMnO3 supports in alkaline media, Scientific Reports, Aug. 2015, pp. 1-14.
Shao, Minhua, et al., Recent Advances in Electrocatalysts for Oxygen Reduction Reaction, Chemical Reviews, Feb. 17, 2016, pp. 3594-3657, 116.

* cited by examiner

SEGMENTED CATION-ANION EXCHANGE MEMBRANE FOR SELF-HUMIDIFICATION OF FUEL CELLS AND METHOD OF MAKING

TECHNICAL FIELD

This disclosure relates to humidification of fuel cells, and, in particular, to the use of a segmented exchange membrane to produce water for humidification of fuel cell feed gases.

BACKGROUND

An acid based polymer electrolyte membrane (PEM) conducts protons from the anode to the cathode in PEM fuel cells more efficiently when the PEM is fully humidified. The PEM loses its ability to conduct protons as it dries under low relative humidity operations in PEM fuel cells. Attempts to develop acid based membranes with high acid loading have been made by reducing the membrane thickness and improving the water transport from the cathode to the anode. The designs attempt to make the PEM less dependent on humidification for efficient proton conduction. However, developing a membrane with high acid loading to improve the proton conductivity has been extremely challenging and expensive. And reduction in membrane thickness to improve the water transport from the cathode to the anode leads to compromise on membrane mechanical strength. In addition, reduction in membrane thickness proportionally increases the crossover rate of hydrogen from the anode to the cathode and oxygen from the cathode to the anode, adversely affecting the durability of the membrane and the electrocatalyst.

To overcome membrane dehydration and maintain the ionic conductivity, PEM fuel cell stacks can employ external humidifiers on both the anode and the cathode to humidify the anode feed gas and cathode oxidant. However, these external humidifiers add cost, complexity, and operational challenges to the PEMFC system and reduce system reliability.

SUMMARY

Disclosed herein are implementations of membrane electrode assemblies for a fuel cell. One implementation comprises a segmented membrane including a porous support having a surface area, the surface area divided into a first portion and a second portion. An alkaline segment is formed from the first portion of the porous support imbibed with an alkaline ionomer. An acid segment is formed from the second portion of the porous support imbibed with an acid ionomer. The alkaline segment is sized to provide a humidification amount to a feed gas passing through the acid segment.

Another implementation of a membrane electrode assembly has a segmented membrane comprising a porous support having a surface area, the surface area divided into a first portion and a second portion. A first fuel cell segment is formed from the first portion of the porous support imbibed with a first ionomer. A second fuel cell segment is formed from the second portion of the porous support imbibed with a second ionomer different from the first ionomer.

Also disclosed is a method of making a membrane electrode assembly. One method comprises masking a first portion of a porous support on each side of the porous support, leaving a second portion exposed. The second portion is imbibed with an acid ionomer to form an acid segment and then cured. The masking is removed from the first portion. The first portion is then imbibed with an alkaline ionomer to form an alkaline segment and cured.

These and other aspects of the present disclosure are disclosed in the following detailed description of the embodiments, the appended claims and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
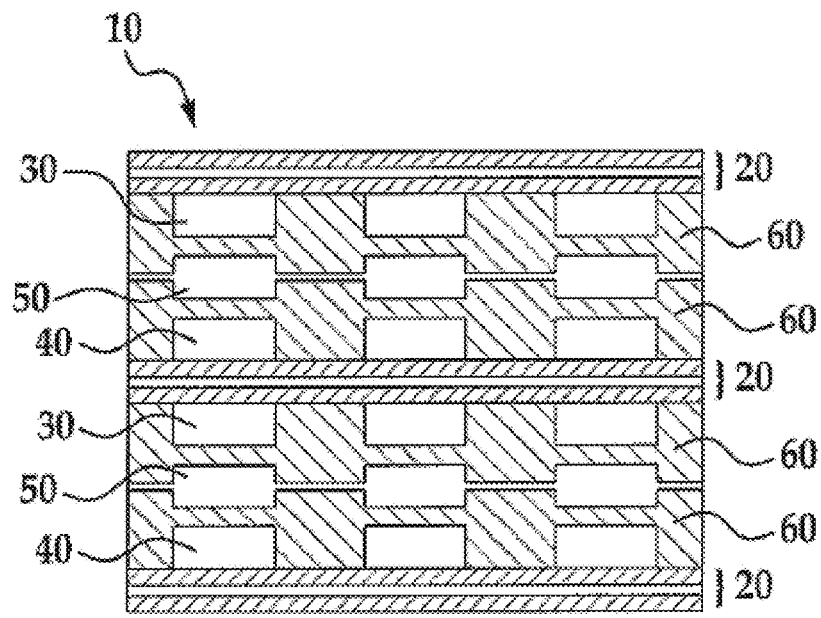
FIG. 1 is a schematic of a fuel cell stack.

FIG. 1 shows a schematic cross-sectional illustration of a portion of a fuel cell stack 10. The illustration is provided as an example and is not meant to be limiting. The fuel cell stack 10 is comprised of multiple membrane electrode assemblies 20. Fuel 30 such as hydrogen is fed to the anode side of a membrane electrode assembly 20, while an oxidant 40 such as oxygen or air is fed to the cathode side of the membrane electrode assembly 20. Coolant 50 is supplied between the fuel 30 and oxidant 40, the coolant 50 separated from the fuel 30 and oxidant 40 by separators 60.

Figure 2:
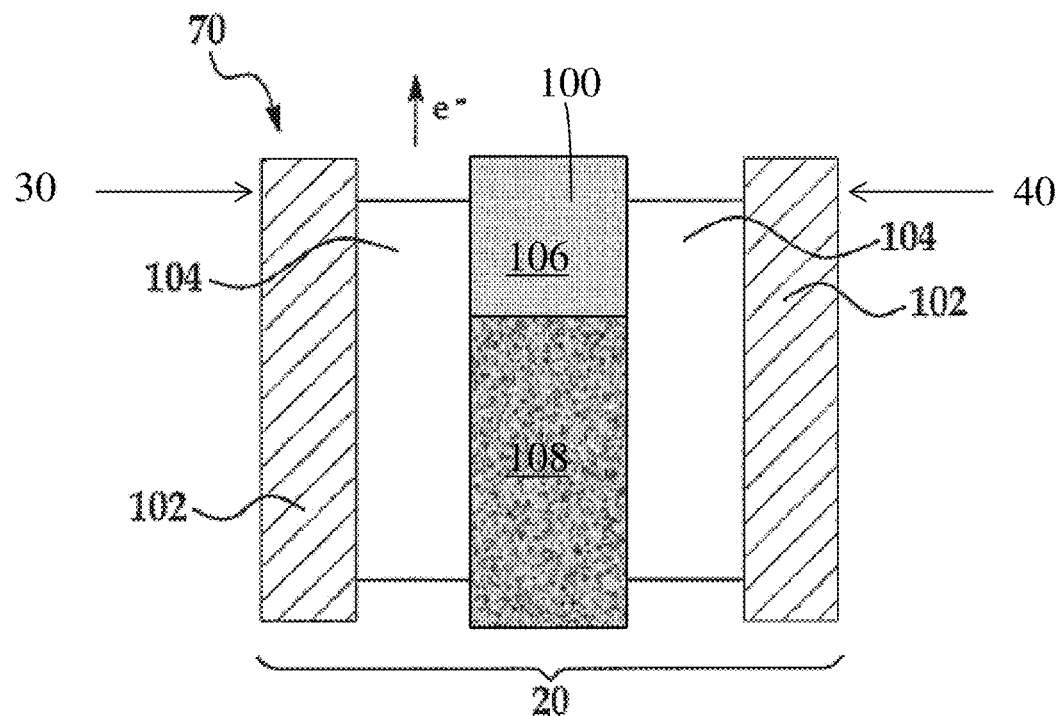
FIG. 2 is a schematic of a membrane electrode assembly having a segmented membrane as disclosed herein.

FIG. 2 is an illustration of one of the plurality of fuel cells 70 in the fuel cell stack 10. The fuel cell 70 is comprised of a single membrane electrode assembly 20. The membrane electrode assembly 20 has a segmented membrane 100 as disclosed herein. The membrane 100 has a catalyst layer 104 formed on opposing surfaces of the membrane 100, such that when assembled, the catalyst layers 104 are each between the membrane 100 and a gas diffusion layer 102. Alternatively, a gas diffusion electrode is made by forming one catalyst layer 104 on a surface of two gas diffusion layers 102 and sandwiching the membrane 100 between the gas diffusion layers 102 such that the catalyst layers 104 contact the membrane 100.

Figure 8:
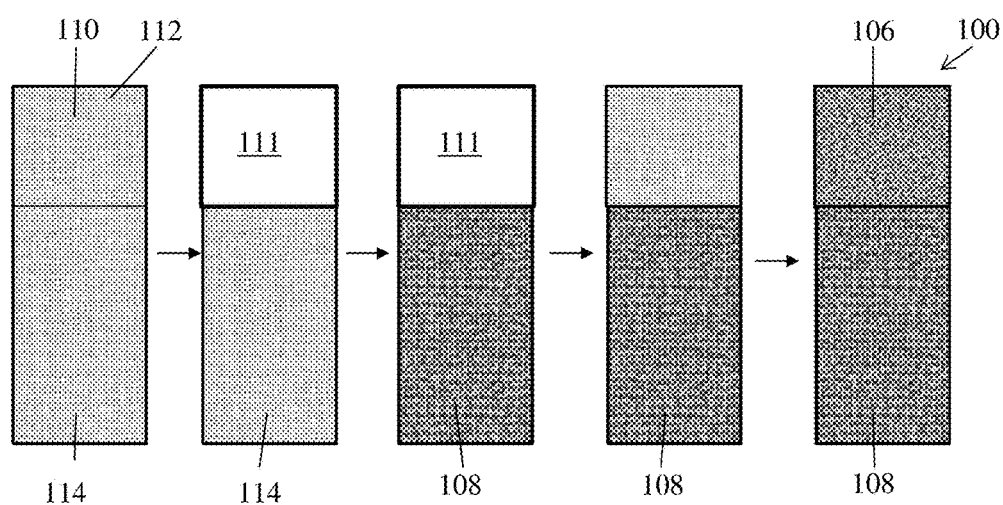
FIG. 8 is a schematic of a method of preparing a segmented membrane as disclosed herein.

The segmented membrane 100 comprises a porous support 110, shown in FIG. 8, having a surface area, the surface area divided into a first portion 112 and a second portion 114. A first fuel cell segment 106 is formed from the first portion 112 of the porous support 110 imbibed with a first ionomer, and a second fuel cell segment 108 is formed from the second portion 114 of the porous support 110 imbibed with a second ionomer different from the first ionomer.

The first fuel cell segment comprising the membrane electrode assembly 100 can be one of an alkaline fuel cell, an acid fuel cell, an intermediate temperature proton conducting fuel cell, a low temperature solid oxide fuel cell, a phosphoric acid fuel cell and a ceramic fuel cell, and the second fuel cell segment 108 is another of an alkaline fuel cell, an acid fuel cell, an intermediate temperature proton conducting fuel cell, a low temperature solid oxide fuel cell, a phosphoric acid fuel cell and a ceramic fuel cell. The first fuel cell segment 106 and the second fuel cell segment 108 can be selected to enhance the overall performance of the fuel cell 70.

Figure 3:
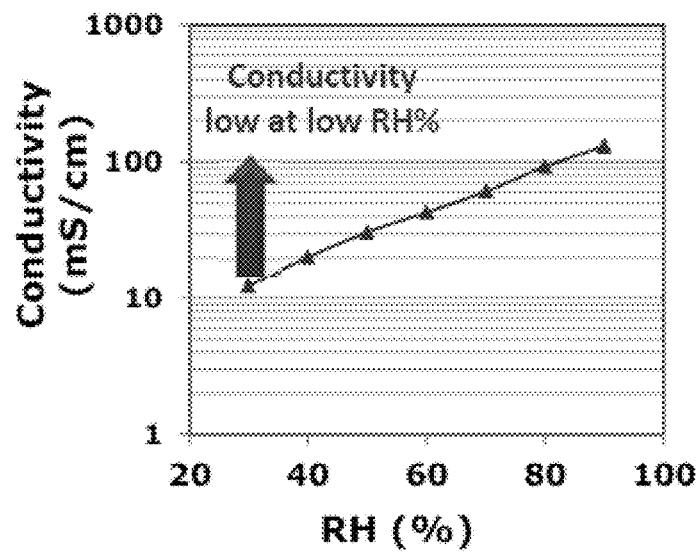
FIG. 3 is a graph illustrating the effect of relative humidity on conductivity.
Figures 4A, 4B:
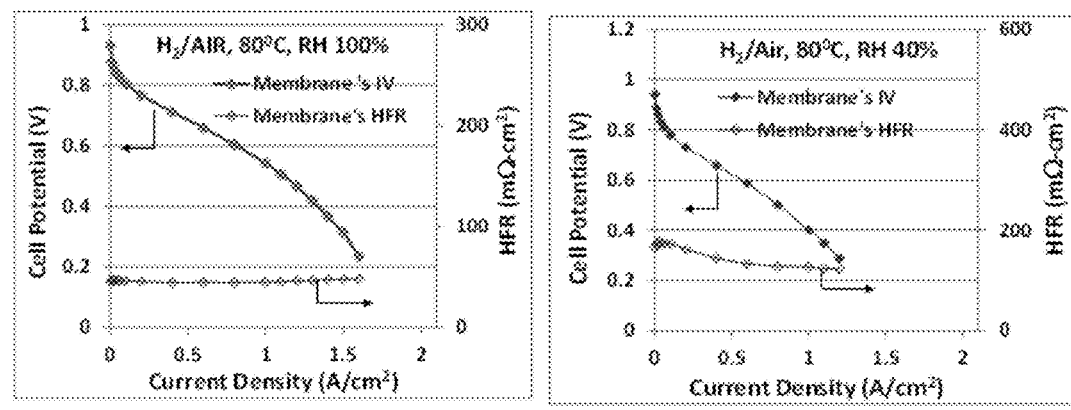
FIG. 4A is a graph illustrating the effect of high relative humidity on fuel cell performance.
FIG. 4B is a graph illustrating the effect of low relative humidity on fuel cell performance.

One non-limiting example of the use of a segmented membrane 100 to improve the performance of a fuel cell 70 is the use of an alkaline segment and an acid segment to provide humidification to one or both fuel cell feeds. FIGS. 3-4B illustrate the effects relative humidity has on fuel cell performance. FIG. 3 illustrates the drop in conductivity as the relative humidity in the fuel cell decreases. FIGS. 4A and 4B compare fuel cell performance at 100% relative humidity and 40% relative humidity, respectively. Each graph shows cell potential (V), current density (A/cm$^2$) and high frequency resistance (HFR, mΩ-cm$^2$). To account for the negative effects of low relative humidity, external humidifiers are used to humidify one or both of the feed gas to the anode and the oxidant to the cathode. These humidifiers are expensive and cumbersome to maintain, add weight and require additional space, which is typically at a premium where fuel cells are used.

In conventional acid membrane based PEM fuel cells, water is generated at the cathode. In conventional alkaline membrane based alkaline fuel cells, water is generated at the anode. As disclosed herein, a segmented membrane is developed, the segments utilizing different ionomers to generate water for humidification within the fuel cell. To humidify the anode feed gas without using an external humidifier, the segmented membrane has a portion of the membrane having an alkaline ionomer to allow water generation at the anode, with a second portion having an acid ionomer. With the segmented membrane, the incoming anode feed gas is humidified with this water generated at the anode. Use of the segmented membrane eliminates the need to use an external humidifier at the anode. In another implementation of the segmented membrane disclosed herein, to humidify the cathode oxidant without using an external humidifier, the segmented membrane is further divided into two alkaline ionomer sections, one section having the anode and the cathode on opposite sides from the other section. The anode of the one section generates water to humidify the oxidant fed to the other section and/or the acid ionomer segment.

Figure 5:
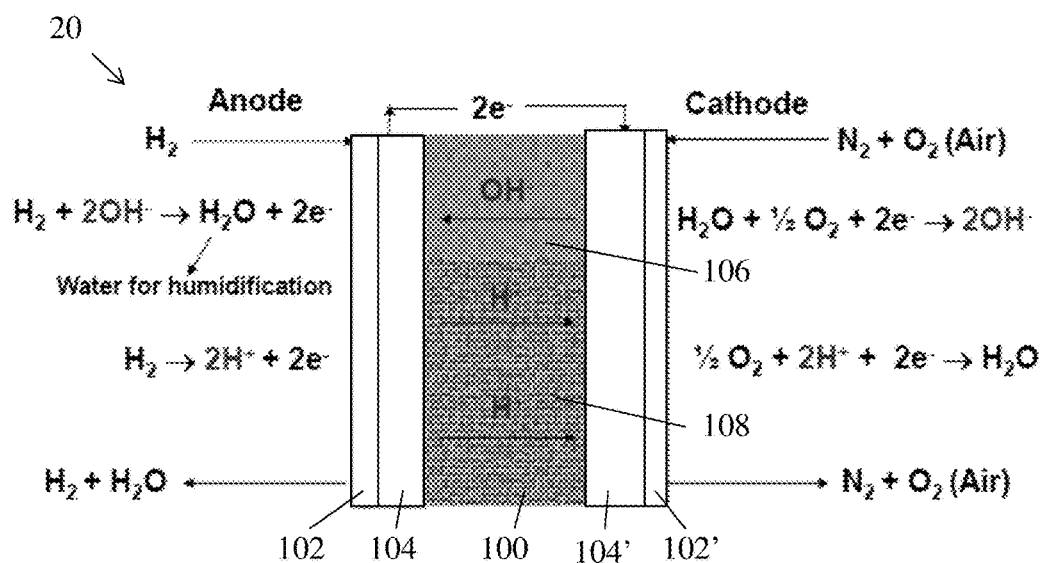
FIG. 5 is a schematic of a fuel cell with a segmented membrane used for humidification of feed gas as disclosed herein.

FIG. 5 illustrates the use of the segmented membrane as a humidifier for the anode feed gas. The segmented membrane 100 includes a porous support 110 having a first portion 112 and a second portion 114. An alkaline segment 106 is formed from the first portion 112 of the porous support 110 imbibed with an alkaline ionomer. An acid segment 108 is formed from the second portion 114 of the porous support 110 imbibed with an acid ionomer. The alkaline segment 106 is sized to provide a humidification amount to a feed gas 30 passing through the acid segment 108.

For the example illustrated in FIG. 5, hydrogen is used as the anode feed gas 30 and air is used as the oxidant 40 fed to the cathode. The anode comprises a gas diffusion layer 102 and the anode catalyst layer 104 on one side of the segmented membrane 100. The cathode comprises another gas diffusion layer 102' and the cathode catalyst layer 104' on an opposing side of the segmented membrane 100. As illustrated in FIG. 5, the hydrogen enters the anode at the alkaline segment 106. The alkaline segment 106 produces water at the anode, which is picked up by the hydrogen, humidifying the hydrogen. The hydrogen, or feed gas 30 feed, is located at the alkaline segment 106 so that the water is generated and picked up by the hydrogen, or feed gas 30, prior to entering the acid segment 108.

The first portion 112 has a first surface area and the second portion 114 has a second surface area. The first surface area of the first portion 112 is sized based on the flow rate of the hydrogen, or feed gas 30, to provide sufficient alkaline ionomer volume to humidify the hydrogen, or other feed gas, to at least 80% RH. The surface area of the alkaline segment 106 will typically be smaller than the surface area of the acid segment 108.

The anode catalyst layer 104 and the cathode catalyst layer 104' can be the same catalyst material or can be different from the other. As a non-limiting example, the anode and cathode catalyst layers 104, 104' can both be a carbon platinum (Pt/C) catalyst. Other alternative catalyst materials for oxygen reduction in an alkaline segment include, but are not limited to, Ag—Au, Ag—Cu, Ag—Pd, Ag—Co, Mo$_2$C/C, Ag/LaMnO, Fe phthalocyanine/MW-CNT, Co phthalocyanine/MWCNT, and Mn$_2$O$_3$. Other alternative catalyst materials for oxygen reduction in an acid segment include, but are not limited to, Pt—Co/C, Pt—Ni/C, and Pt—Fe/C.

To further optimize the fuel cell performance, the cathode catalyst layer 104' can be a catalyst specific to alkaline fuel cells on the alkaline segment 106 of the segmented membrane 100 and a catalyst specific to acid fuel cells on the acid segment 108 of the segmented membrane 100. The anode catalyst layer 104 can be common to both the acid and alkaline segments 108, 106.

The gas diffusion layers 102, 102' are one or more types of carbon material, including, but not limited to, non-woven carbon fiber paper or woven carbon cloth. The gas diffusion layers 102, 102' provide conductivity and assist the feed gas and oxidant to come in contact with the catalyst layers 104, 104'.

The acid ionomer used in the acid segment 108 can be any liquid acidic ionomer used in fuel cells. As a non-limiting example, a perfluorosulfonic acid (PFSA) ionomer such as Nafion™ PFSA Ionomer Dispersion from The Chemours Company (Formerly DuPont Chemical Company), Aquivion™ PFSA Ionomer from Solvay, and Flemion™ PFSA Ionomer from Asahi Glass Company Ltd.

The alkaline ionomer used in the alkaline segment 106 can be any liquid alkaline ionomer used in alkaline fuel cells. As non-limiting examples, an alkaline ionomer from ACTA, a liquid ionomer based on 4-vinyl benzyl trimethyl hydroxide with a compatible monomer/polymer, and an alkaline ionomer from Tokuyama Corp. can be used. Although FIG. 5 shows the alkaline segment 106 is located above the acid segment 108, in an alternate embodiment, the alkaline segment can be located at any location near or within the acid segment 108. For example, the alkaline segment 106 can be located on the side of the acid segment 108, below the acid segment 108 or completely surrounded by the acid segment 108. In an alternative embodiment, there can be any number of alkaline segments 106 and acid segments 108.

Figure 6:
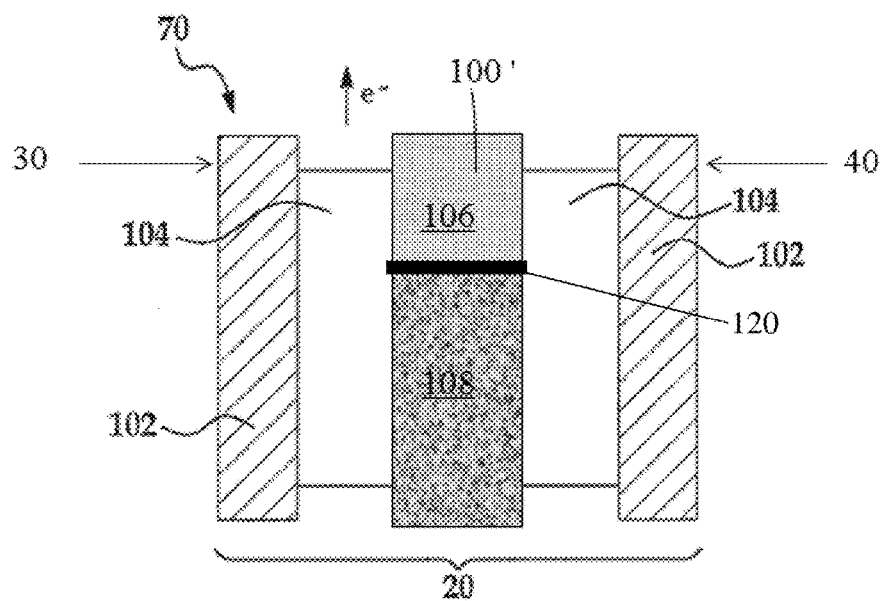
FIG. 6 is a schematic of another membrane electrode assembly having another implementation of the segmented membrane.

In another implementation of the segmented membrane disclosed herein, the first portion 112 and the second portion 114 can be two separate portions of a porous substrate 110 that are separately made into the alkaline segment 106 and the acid segment 108. As illustrated in FIG. 6, the segmented membrane 100' is formed using a seal 120 to attach the alkaline segment 106 to the acid segment 108. The seal 120 can be a fluorinated polymer. The seal 120 also prevents leakage of gasses around the segments.

Figure 7:
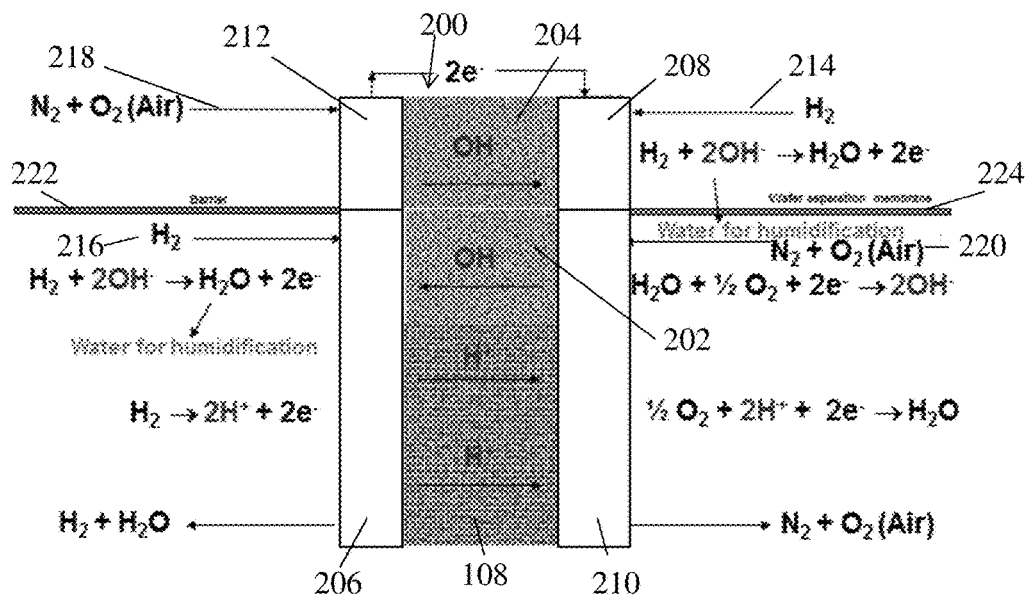
FIG. 7 is a schematic of another membrane electrode assembly having yet another implementation of the segmented membrane.

In yet another implementation of the segmented membrane 200 disclosed herein, the alkaline segment 106 is divided into a first alkaline segment 202 adjacent the acid segment 108 and a second alkaline segment 204, as shown in FIG. 7. An anode catalyst layer 206 is on a first side of the segmented membrane 200 on both the first alkaline segment 202 and the acid segment 108. An anode catalyst layer 208 is on a second side of the segmented membrane 200 on the second alkaline segment 204. A cathode catalyst layer 210 is on the second side of the segmented membrane 200 on both the first alkaline segment 202 and the acid segment 108. A cathode catalyst layer 212 is on the first side of the segmented membrane 200 on the second alkaline segment 204. As discussed above, the anode catalyst and cathode catalyst material can be the same catalyst material or be of different materials. A feed gas inlet 214 is located at the anode catalyst layer 208 of the second alkaline segment 204. Another feed gas inlet 216 is located at the anode catalyst layer 206 of the first alkaline segment 202. An oxidant inlet 218 is located at the cathode catalyst layer 212 of the second alkaline segment 204, and another oxidant inlet 220 is located at the cathode catalyst layer 210 of the first alkaline segment 202. A barrier layer 222 is positioned between the oxidant inlet 218 to the second alkaline segment 204 and the other feed gas inlet 216 to the first alkaline segment 202. A water separation membrane 224 is positioned between the other oxidant inlet 220 to the first alkaline segment 202 and the feed gas inlet 214 of the second alkaline segment 204.

As illustrated in FIG. 7 using hydrogen as the feed gas and air as the oxidant, the second alkaline segment 204 provides water from its anode to the air at the cathode of the first alkaline segment 202 and the acid segment 108. The first alkaline segment 202 provides water at its anode to the hydrogen to the acid segment 108. The barrier layer 222 is a physical partition configured to prevent passage of fluids across the barrier layer 222. The water separation membrane 224 is a cation exchange material configured to allow water to pass to humidify oxidant to the first alkaline segment 202 while preventing passage of oxidant and feed gas. The water separation membrane 224 would allow water to pass from the second alkaline segment 204 to the air inlet 220 for the first alkaline segment 202 and the acid segment 108. The water separation membrane 224 would not allow other gases to pass from the second alkaline segment 204 to the air inlet 220 for the first alkaline segment 20021 and the acid segment 108.

Figure 9:
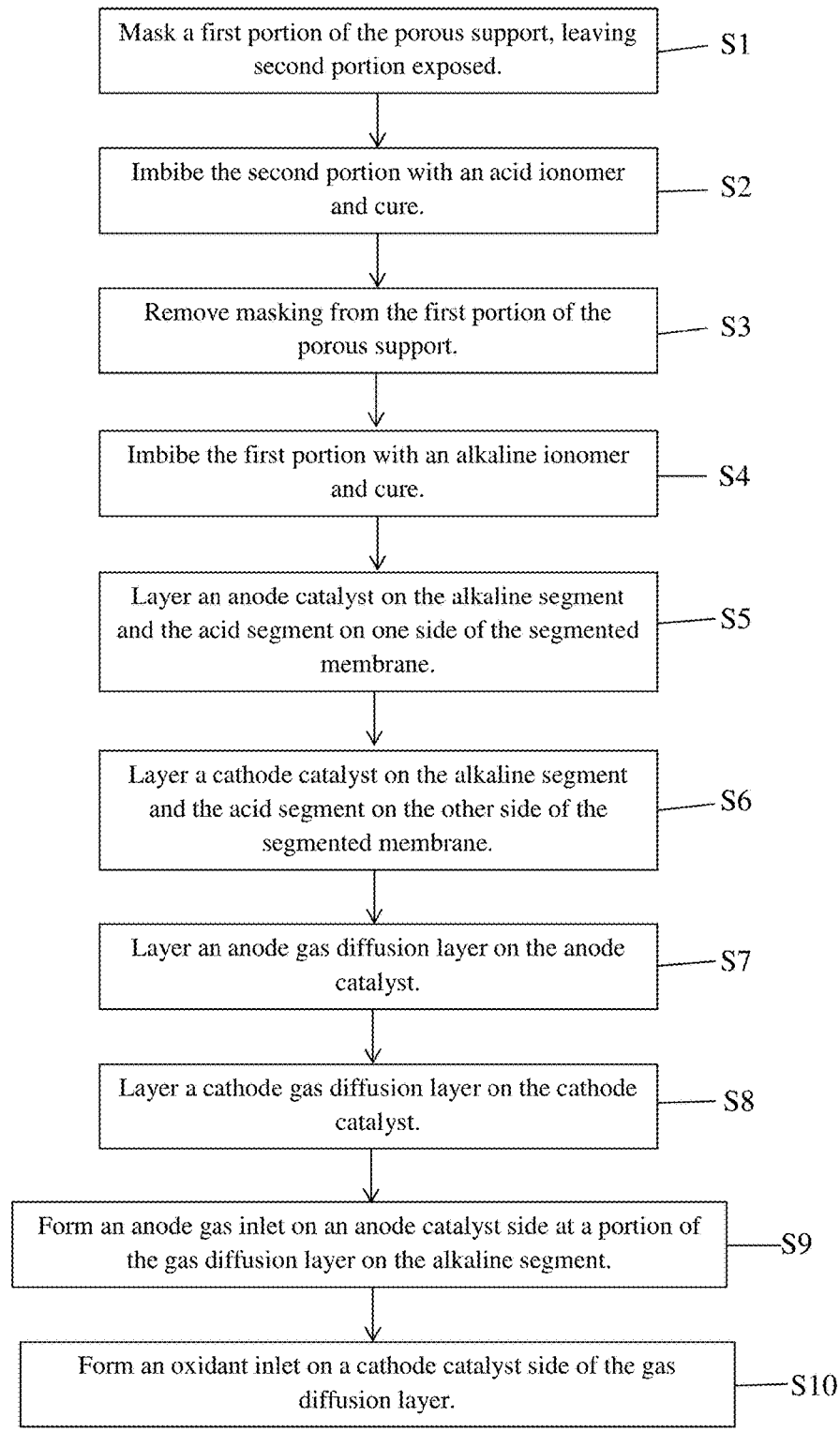
FIG. 9 is a flow diagram of a method of making the membrane electrode assembly disclosed herein.

Also disclosed are methods of making the membrane electrode assemblies herein. One method of making the segmented membrane 100 for the membrane electrode assembly is shown in the schematic of FIG. 8 and the flow diagram of FIG. 9. A piece of porous support 110 is provided the desired size of the resulting segmented membrane 100. The porous support can be, as a non-limiting example, polytetrafluoroethylene. In step S1, a first portion 112 of the porous support 110 is masked with masking 111 on each side of the porous support 110, leaving the second portion 114 exposed. In step S2, the second portion 114 is imbibed with an acid ionomer to form the acid segment 108 of the segmented membrane 100 and then cured. In step S3, the masking is removed from the first portion 112 to expose the first portion 112. In step S4, the first portion 112 is then imbibed with an alkaline ionomer to form the alkaline segment 106 of the segmented membrane 100 and cured. It is noted that the second portion 114 can be masked first with the first portion 112 imbibed with the alkaline ionomer and cured, with the second portion 114 unmasked and imbibed with the acid ionomer next and cured. It is also noted that the alkaline ionomer and acid ionomer can be cured together as a last step in forming the segmented membrane 100.

To prepare the membrane electrode assembly 20, an anode catalyst 104 is layered on both the alkaline segment 106 and the acid segment 108 on one side of the segmented membrane 100 in step S5. In step S6, an anode gas diffusion layer 102 is layered on the anode catalyst 104. A cathode catalyst 104' is layered on both the alkaline segment 106 and the acid segment 108 of the other side of the segmented membrane 100 in step S7. A cathode gas diffusion layer 102' is layered on the cathode catalyst 104' in step S8. An anode gas inlet 30 is formed on an anode catalyst side at a portion of the gas diffusion layer 102 on the alkaline segment 106 in step S9, and an oxidant inlet 40 is formed on a cathode catalyst side at the gas diffusion layer 102' in step S10. Note that the order of steps can be changed so long as the layers are in the appropriate positions.

Figure 10:
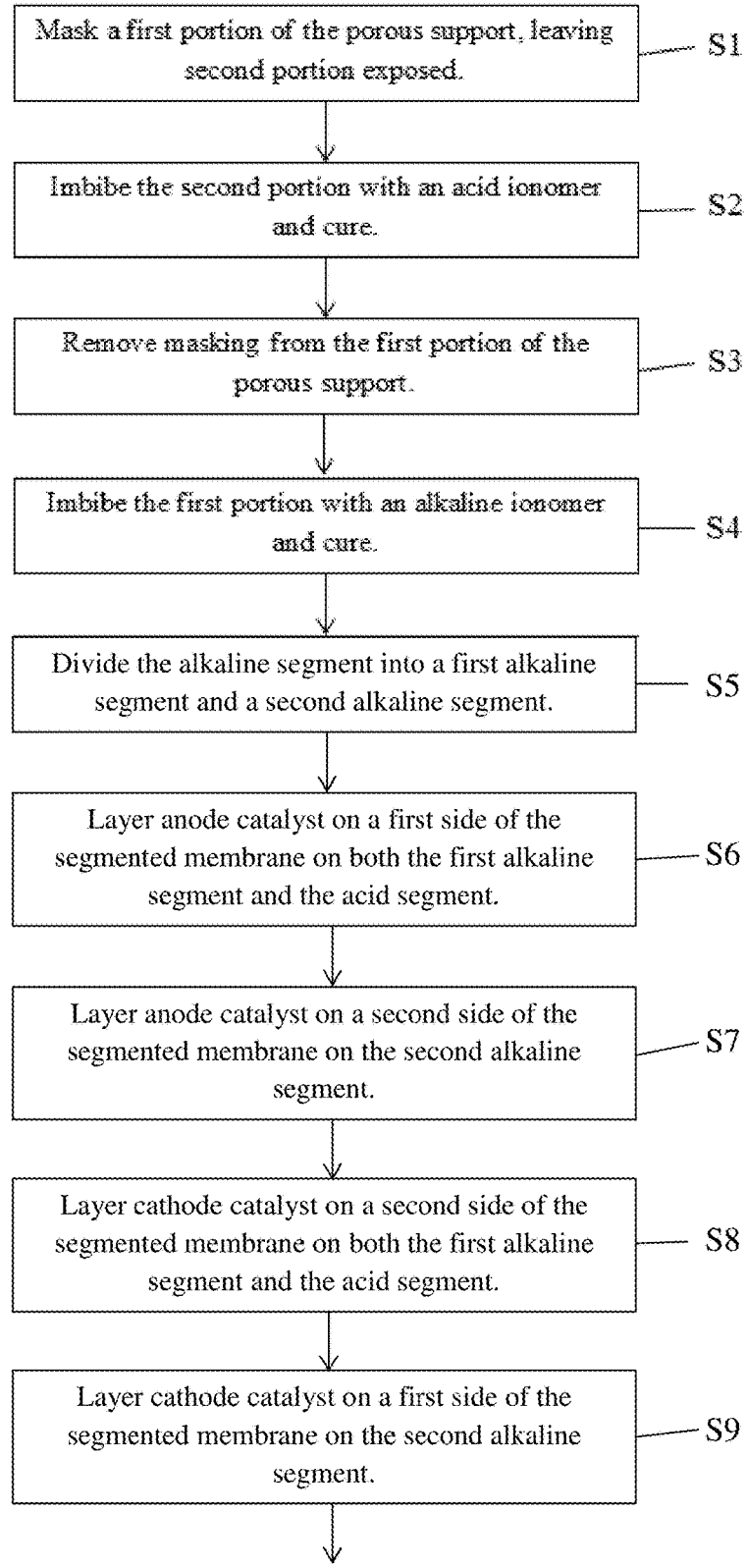
FIG. 10 is a flow diagram of a method of making another membrane electrode assembly disclosed herein.
Figure 10:
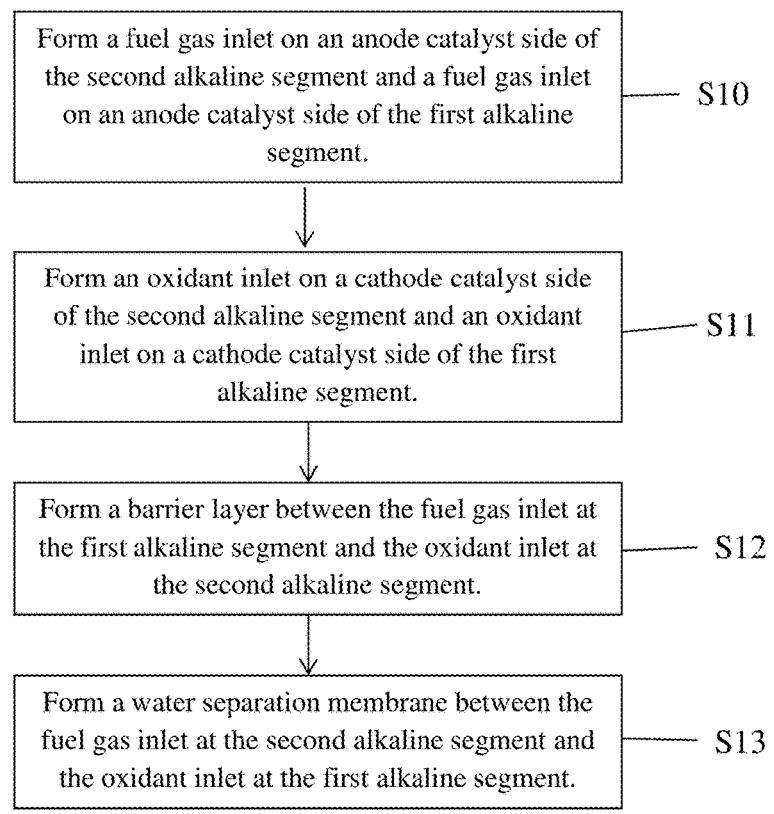

FIG. 10 is a flow diagram of another method of making the membrane electrode assembly 200 disclosed herein. Steps S1-S4 are the same as those in FIG. 9 and will not be repeated here. In step S5, the alkaline segment 106 is divided into a first alkaline segment 202 adjacent the acid segment 108 and a second alkaline segment 204. In step S6, anode catalyst 206 is layered on a first side of the segmented membrane 200 on both the first alkaline segment 202 and the acid segment 108. In step S7, anode catalyst 208 is layered on a second side of the segmented membrane 200 on the second alkaline segment 204. In step S8, cathode catalyst 210 is layered on the second side of the segmented membrane 200 on both the first alkaline segment 202 and the acid segment 108. Cathode catalyst 212 is layered on the first side of the segmented membrane 200 on the second alkaline segment 204 in step S9. A gas diffusion layer (not shown) is layered on all catalyst.

A feed gas inlet 214 is provided at the anode catalyst 208 of the second alkaline segment 204 and another feed gas inlet 216 is provided at the anode catalyst 206 of the first alkaline segment 202 in step S10. An oxidant inlet 218 is provided at the cathode catalyst 212 of the second alkaline segment 204 and another oxidant inlet 220 is provided at the cathode catalyst 210 of the first alkaline segment 202 in step S11. In step S12, a barrier layer 222 is positioned between the oxidant inlet 218 of the second alkaline segment 204 and the feed gas inlet 216 of the first alkaline segment 202. In step S13, a water separation membrane 224 is formed between the oxidant inlet 220 of the first alkaline segment 202 and the feed gas inlet 214 of the second alkaline segment 204.

For simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

As used herein, the terminology "example," "embodiment," "implementation," "aspect," "feature," or "element" indicate serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "determine" and "identify," or any variations thereof, includes selecting, ascertaining, computing, looking up, receiving, determining, establishing, obtaining, or otherwise identifying or determining in any manner whatsoever using one or more of the devices shown and described herein.

As used herein, the terminology "or" is intended to mean an inclusive "or" rather than an exclusive "or." That is, unless specified otherwise, or clear from context, "X includes A or B" is intended to indicate any of the natural inclusive permutations. If X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A fuel cell comprising:
    a segmented membrane comprising:
        a porous support having a surface area, the surface area divided into a first portion and a second portion;
        an alkaline segment formed from the first portion of the porous support imbibed with an alkaline ionomer; and
        an acid segment formed from the second portion of the porous support imbibed with an acid ionomer, wherein the alkaline segment is sized to provide a humidification amount to a feed gas passing through the acid segment, wherein the alkaline segment is divided into a first alkaline segment adjacent the acid segment and a second alkaline segment;
    an anode catalyst layer on a first side of the segmented membrane on both the first alkaline segment and the acid segment;
    an anode catalyst layer on a second side of the segmented membrane on the second alkaline segment;
    a cathode catalyst layer on the second side of the segmented membrane on both the first alkaline segment and the acid segment;
    a cathode catalyst layer on the first side of the segmented membrane on the second alkaline segment;
    a feed gas inlet at the anode catalyst layer of the second alkaline segment;
    another feed gas inlet at the anode catalyst layer of the first alkaline segment;
    an oxidant inlet at the cathode catalyst layer of the second alkaline segment;
    another oxidant inlet at the cathode catalyst layer of the first alkaline segment;
    a barrier layer between the oxidant inlet to the second alkaline segment and the other feed gas inlet to the first alkaline segment; and
    a water separation membrane between the other oxidant inlet to the first alkaline segment and the feed gas inlet of the second alkaline segment.

2. The fuel cell of claim 1, wherein the first portion has a first surface area and the second portion has a second surface area, the first surface area being smaller than the second surface area.

3. The fuel cell of claim 1, wherein the barrier layer is a fluorinated polymer.

4. The fuel cell of claim 1, wherein the cathode catalyst layer comprises a catalyst specific to alkaline fuel cells on the alkaline segment of the segmented membrane and a catalyst specific to acid fuel cells on the acid segment of the segmented membrane.

5. The fuel cell of claim 1, wherein the water separation membrane is a cation exchange material configured to allow water to pass to humidify oxidant to the first alkaline segment while preventing passage of oxidant and feed gas.

6. The fuel cell of claim 1, wherein the barrier layer is a physical partition configured to prevent passage of fluids across the barrier layer.

7. A membrane electrode assembly, comprising:
    a segmented membrane comprising:
        a porous support having a surface area, the surface area divided into a first portion and a second portion;
        a first fuel cell segment formed from the first portion of the porous support imbibed with a first ionomer; and
        a second fuel cell segment formed from the second portion of the porous support imbibed with a second ionomer different from the first ionomer, wherein the first fuel cell segment is divided into a first partial segment adjacent the second fuel cell segment and a second partial segment;
    an anode catalyst layer on a first side of the segmented membrane on both the first partial segment and the second fuel cell segment;
    an anode catalyst layer on a second side of the segmented membrane on the second partial segment;
    a cathode catalyst layer on the second side of the segmented membrane on both the first partial segment and the second fuel cell segment; and
    a cathode catalyst layer on the first side of the segmented membrane on the second partial segment.

8. A fuel cell comprising the membrane electrode assembly of claim 7, wherein the first fuel cell segment is one of an alkaline fuel cell, an acid fuel cell, an intermediate temperature proton conducting fuel cell, a low temperature solid oxide fuel cell, a phosphoric acid fuel cell and a ceramic fuel cell, and the second fuel cell segment is another of an alkaline fuel cell, an acid fuel cell, an intermediate temperature proton conducting fuel cell, a low temperature solid oxide fuel cell, a phosphoric acid fuel cell and a ceramic fuel cell.

9. A method of making a fuel cell, comprising:
preparing a segmented membrane comprising:
- masking a first portion of a porous support on each side of the porous support, leaving a second portion exposed;
- imbibing the second portion with an acid ionomer to form an acid segment;
- curing the second portion;
- removing the masking from the first portion;
- imbibing the first portion with an alkaline ionomer to form an alkaline segment;

curing the first portion; and
- dividing the alkaline segment into a first alkaline segment adjacent the acid segment and a second alkaline segment;

layering anode catalyst on a first side of the segmented membrane on both the first alkaline segment and the acid segment;
layering anode catalyst on a second side of the segmented membrane on the second alkaline segment;
layering cathode catalyst on the second side of the segmented membrane on both the first alkaline segment and the acid segment;
layering cathode catalyst on the first side of the segmented membrane on the second alkaline segment;
providing a feed gas inlet at the anode catalyst of the second alkaline segment;
providing another feed gas inlet at the anode catalyst of the first alkaline segment;
providing an oxidant inlet at the cathode catalyst of the second alkaline segment;
providing another oxidant inlet at the cathode catalyst of the first alkaline segment;
forming a barrier layer between the oxidant inlet of the second alkaline segment and the other feed gas inlet of the first alkaline segment; and
forming a water separation membrane between the other oxidant inlet of the first alkaline segment and the feed gas inlet of the second alkaline segment.

10. The method of claim 9, further comprising:
selecting a surface area of the first portion to achieve a humidification level of an anode gas feed.

11. The method of claim 9, wherein the cathode catalyst comprises a catalyst specific to alkaline fuel cells on the alkaline segment of the segmented membrane and a catalyst specific to acid fuel cells on the acid segment of the segmented membrane.

12. The method of claim 9, wherein the water separation membrane is a cation exchange material configured to allow water to pass to humidify oxidant to the first alkaline segment while preventing passage of oxidant and feed gas.

13. The method of claim 9, wherein the barrier layer is a physical partition configured to prevent passage of fluids across the barrier layer.

* * * * *